H. A. STEEN.
THERMOSTAT.
APPLICATION FILED JULY 22, 1911.

1,110,153.

Patented Sept. 8, 1914.

Witnesses
Rob. E. Stoll
Clara E. Bensel

Inventor
Halfdan A. Steen
By Chas. E. Lord
Attorney

UNITED STATES PATENT OFFICE.

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

THERMOSTAT.

1,110,153.  Specification of Letters Patent.  Patented Sept. 8, 1914.

Application filed July 22, 1911. Serial No. 639,970.

*To all whom it may concern:*

Be it known that I, HALFDAN A. STEEN, subject of the King of Norway, residing at Milwaukee, in the county of Milwaukee and State of Wisconsin, have invented certain new and useful Improvements in Thermostats, of which the following is a full, clear, and exact specification.

My invention relates to thermostats.

In the operation of electrical apparatus, it is often necessary that an overload or other abnormal condition be allowed to exist for a definite length of time before causing an interruption of the circuit. It is also often desirable that the length of time during which such overload or other abnormal condition may continue vary in inverse sense to the extent of such condition.

It is the object of my present invention to provide a device for accomplishing these ends which has certain advantages over those heretofore proposed.

In carrying out my invention there is provided a thermostat the heating of which is obtained by a coil which is movable relatively to the member or members to be heated, this relative movement being produced to bring the parts into proximity upon the occurrence of a predetermined overload or other abnormal condition. The heating coil may be supplied from any suitable source, but preferably with current which varies in the same sense as does the overload; and may be either always in circuit or connected in circuit only upon the occurrence of the overload or other abnormal condition. The thermostat, upon being heated sufficiently, causes the tripping of the protecting circuit-breaker.

The various novel features of my invention will appear from the description and drawings, and will be particularly pointed out in the claims.

Figure 1:
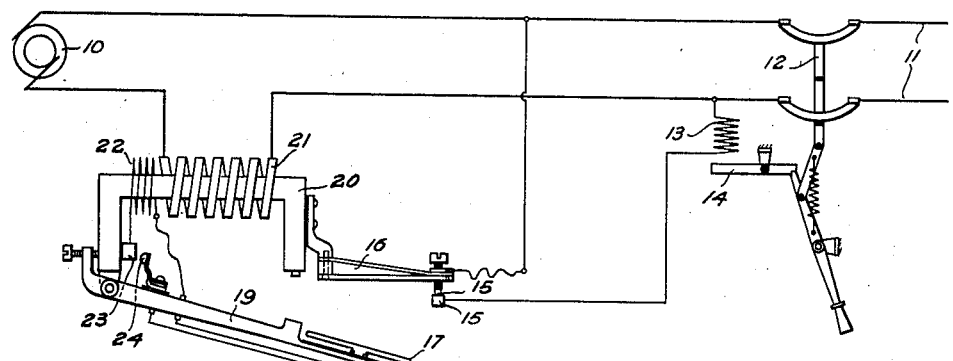
Figure 2:
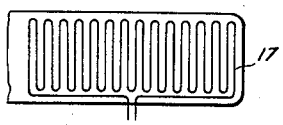
Figure 3:
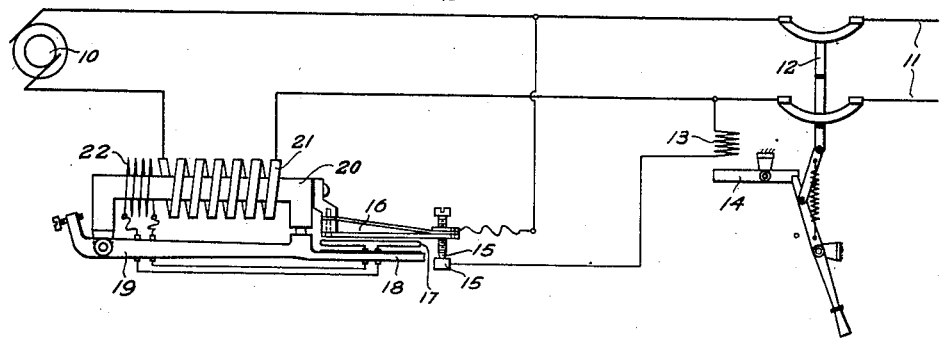

Figure 1 shows diagrammatically one embodiment of my invention; Fig. 2 is a fragmentary view showing a plan of the heating coil; and Fig. 3 shows diagrammatically a modified embodiment of my invention.

The device to be protected, shown as an alternating current generator 10, is connected to the circuit 11 through a circuit-breaker 12. This circuit-breaker is biased to open position, but is normally held in closed position by a holding coil 13 acting on a latch 14. The coil 13 is shown connected as a no-voltage coil. The circuit of the holding coil 13 is completed through the contacts 15 of a suitable thermostat 16; the thermostat shown has two members which on heating expand differentially to cause relative movement between the contacts 15.

The thermostat is heated by a heating coil 17, which is not fixed relatively to the thermostat proper but is mounted on an extension 18 of the pivoted armature 19 of an overload responsive device having a core 20 and a coil 21. This coil 21 is connected in any suitable manner, as in series, so as to carry a current proportional to that supplied by the generator 10. The heating coil 17 may be supplied with current in any suitable manner, one preferred arrangement being to connect it to a coil 22 mounted on the core 20 and acting as the secondary winding of a transformer of which the winding 21 is the primary. The connection between the heating coil 17 and the secondary coil 22 may be either a permanent one, as shown in Fig. 3, or one which is only closed upon the lifting of the armature 19, being broken at the switch contacts 23 and 24 when the armature 19 is in its lowest position, as shown in Fig. 1.

When the current supplied by the generator 10 is below the predetermined value for which the overload device is set, the armature 19 remains in its lowest position, as shown in Fig. 1. At that time the circuit of the coil 17 may be interrupted as shown in Fig. 1 or may be complete on account of the permanent connection shown in Fig. 3. On account of the distance from the heating coil 17 to the thermostat 16, the heating coil, even if energized at this time, will produce no effect on the thermostat. If the current supplied by the generator 10 exceeds a predetermined value, the overload responsive device lifts its armature 19 and brings the heating coil 17 into close proximity to the thermostat 16, as shown in Fig. 3, at the same time closing the circuit of the heating coil if such circuit is not permanently complete. The heating coil is supplied from the secondary coil 22 with a current varying in the same sense as does the current supplied by the generator 10. The heat produced in the coil 17 will be radiated to the thermostat 16 and cause the free end of the latter to flex upward. After a time which varies in inverse sense to the current supplied by the generator 10, the deflexion of the thermostat will be sufficient to separate the contacts 15, thus deënergizing the holding coil 13 to cause the tripping of the circuit-breaker 12. If before the thermostat 16 has deflected sufficiently to cause the separation of the contacts 15 the current supplied by the generator 10 should drop below the predetermined value for which the overload device is set, the armature 19 will drop and separate the heating coil 17 from the heating coil 16. The thermostat will then cool, and be ready for operation the next time the current supplied by the generator 10 exceeds the predetermined value.

Many modifications may be made in the precise arrangement shown and described, and I aim to cover all such which do not involve a departure from the spirit and scope of my invention as set forth in the following claims.

What I claim as new is:

1. In a circuit protecting device, a thermostat, a heating coil therefor, said heating coil being movable relatively to the thermostat, and means responsive to abnormal conditions in the circuit to be protected for moving the heating coil into proximity to the thermostat.

2. In combination, a thermostat, a heating coil therefor carrying a current which varies in the same sense as does that in the circuit to be protected, and means for moving said heating coil relatively to the thermostat.

3. In combination, a thermostat, a heating coil therefor, said heating coil being movable relatively to the thermostat, a device for moving said heating coil into proximity to the thermostat when the current in a circuit to be protected reaches an abnormal value, and a coil in inductive relation to said device for energizing said heating coil.

4. In combination, a thermostat, a heating coil therefor, and means for controlling the distance between the heating coil and thermostat by variations in the current in a circuit to be protected.

5. In combination, a thermostat, a heating coil therefor, and means for controlling both the distance between the heating coil and the thermostat and the current in the heating coil by variations in the current in a circuit to be protected.

6. In combination, an electromagnetic device comprising a plurality of relatively movable parts and a current-carrying coil, and a thermostat operatively associated with said electromagnetic device, said electromagnetic device producing energy for operating said thermostat when said relatively movable parts are in the positions occupied by them on the passage of current of a predetermined value through said coil.

7. In a circuit protecting device, a thermostat, a coil carrying current proportional to that flowing in the circuit to be protected, and means coöperatively associated with said current-carrying coil and said thermostat for producing heat in the thermostat and varying the distance between the thermostat and the heat-producing means when an abnormal condition exists in the circuit to be protected.

8. In combination, an electromagnetic device comprising fixed and movable parts, a current-carrying coil, and a thermostat operatively associated with said electromagnetic device, said electromagnetic device adapted to produce heat in said thermostat when the movable part is in that position to which it is moved by an abnormal condition of the current in said coil.

Milwaukee, Wis., July 7, 1911.

In testimony whereof I affix my signature, in the presence of two witnesses.

HALFDAN A. STEEN.

Witnesses:
G. B. SCHLEY,
CHAS. L. BYRON.